United States Patent
Stone

(10) Patent No.: US 6,488,068 B2
(45) Date of Patent: Dec. 3, 2002

(54) FIXTURE FOR APPLYING MOLDING TO VEHICLES

(75) Inventor: Charles L. Stone, Metamora, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/759,420

(22) Filed: Jan. 12, 2001

(65) Prior Publication Data

US 2002/0092623 A1 Jul. 18, 2002

(51) Int. Cl.[7] .................................................. B44C 7/04
(52) U.S. Cl. ...................... 156/574; 156/71; 156/580; 29/235; 29/238; 29/714
(58) Field of Search ......................... 29/714, 795, 822, 29/823, 824, 235, 238; 156/71, 574, 580

(56) References Cited

U.S. PATENT DOCUMENTS

| | | | |
|---|---|---|---|
| 1,881,519 A | * 10/1932 | Groehn et al. ............. 414/626 |
| 3,565,478 A | 2/1971 | George |
| 3,752,521 A | 8/1973 | Lafebre |
| 4,589,184 A | * 5/1986 | Asano et al. ................. 29/430 |
| 4,683,096 A | 7/1987 | Ferraro |
| 4,706,379 A | * 11/1987 | Seno et al. .................... 29/740 |
| 4,736,515 A | * 4/1988 | Catena ........................ 29/714 |
| 4,789,417 A | * 12/1988 | Komatsu et al. ............ 156/356 |
| 4,939,838 A | 7/1990 | Gatta |
| 5,010,634 A | * 4/1991 | Uemura et al. .......... 29/407.05 |
| 5,106,439 A | * 4/1992 | Wellings et al. .............. 156/71 |
| 5,735,032 A | * 4/1998 | Stone .......................... 29/235 |
| 5,814,173 A | * 9/1998 | Stone .......................... 156/71 |
| 5,829,123 A | * 11/1998 | Shashlo et al. ............... 29/703 |
| 5,996,207 A | 12/1999 | Brown et al. |
| 5,997,670 A | * 12/1999 | Walter et al. ................. 156/71 |
| 6,042,670 A | * 3/2000 | Kuribayashi et al. ....... 156/108 |
| 6,327,768 B1 | * 12/2000 | Cappa et al. .............. 29/407.1 |
| 6,205,651 B1 | * 3/2001 | Warner ........................ 29/706 |
| 6,339,874 B2 | * 1/2002 | Segawa et al. ............... 29/824 |
| 6,360,804 B1 | * 3/2002 | Field et al. .................. 156/523 |
| 6,408,920 B1 | * 6/2002 | Tanizaki et al. ............ 156/581 |

* cited by examiner

Primary Examiner—S. Thomas Hughes
Assistant Examiner—Essama Omgba
(74) Attorney, Agent, or Firm—Edwin W. Bacon, Jr.

(57) ABSTRACT

A vehicle body side molding apply fixture and control system is provided wherein the loading of the body side molding is easier than in prior application fixtures. Additionally, in a preferred embodiment, the body side molding can additionally apply the side emblems to the vehicle and the retainer which holds the body side molding to the body side molding apply fixture automatically opens after the prior retainer has been applied to the vehicle.

5 Claims, 11 Drawing Sheets

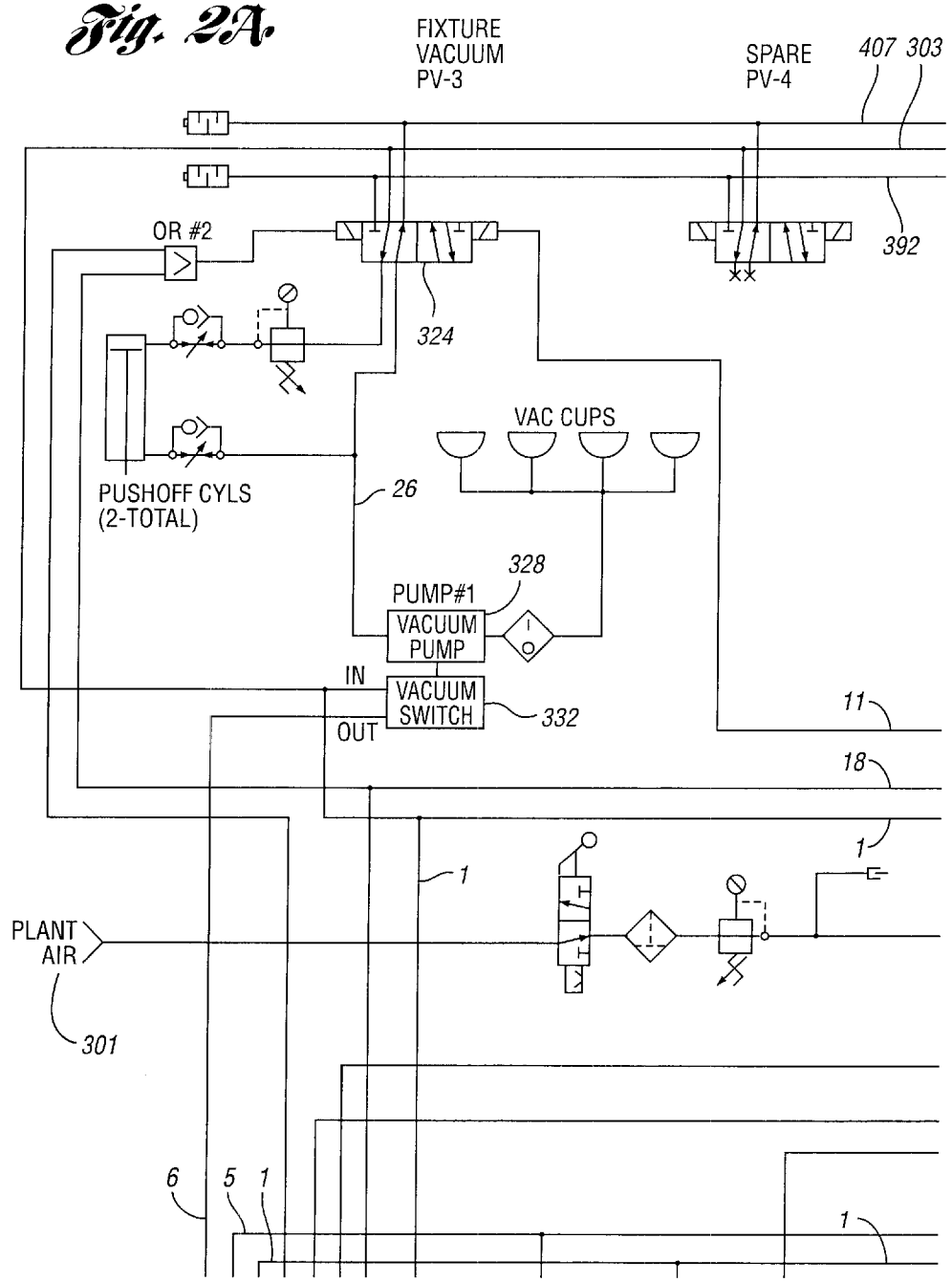

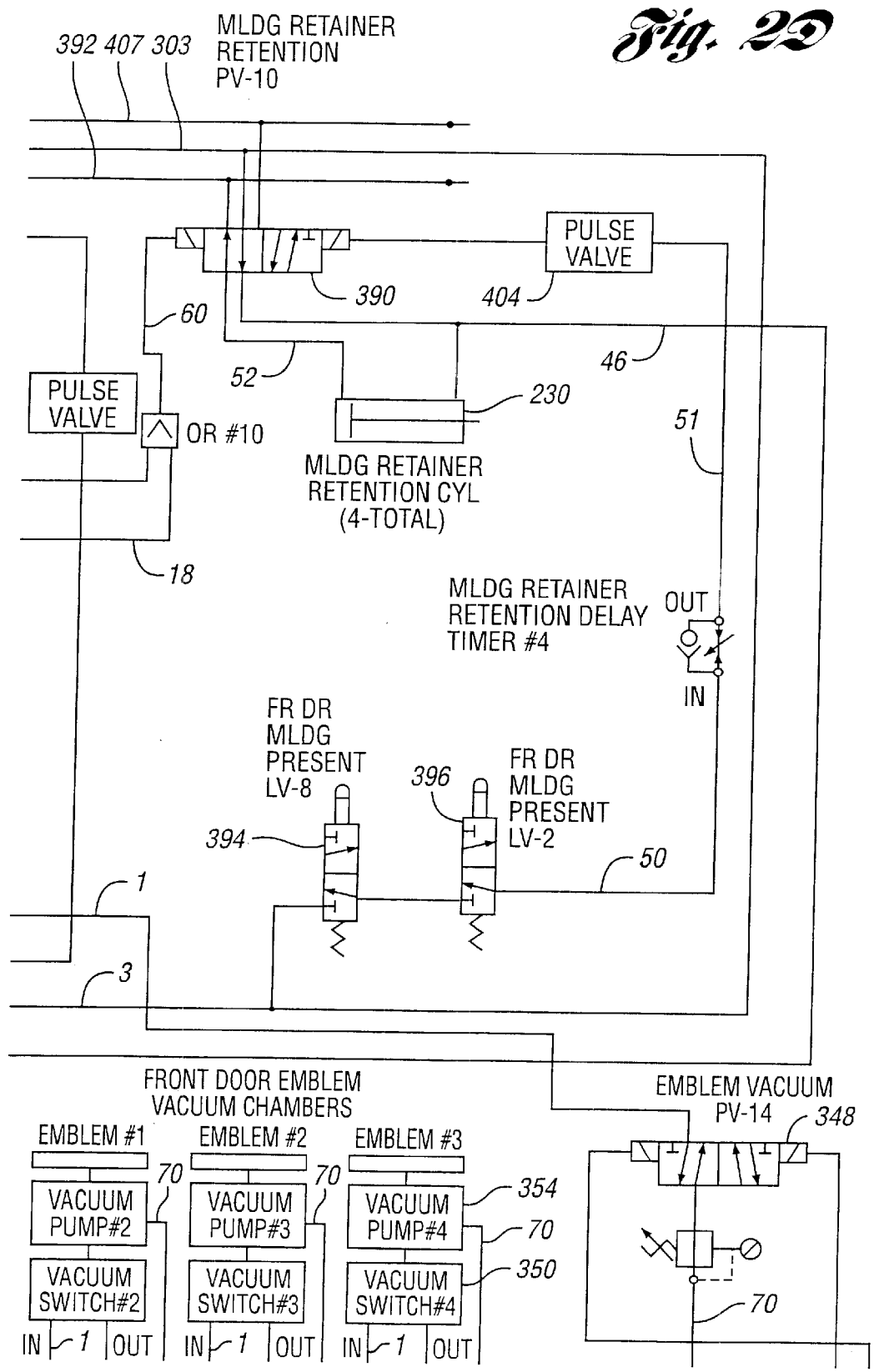

FIXTURE FOR APPLYING MOLDING TO VEHICLES

FIELD OF THE INVENTION

The present invention relates generally to a fixture and a control system thereof of an apparatus to apply body side molding to the side panels of an automotive vehicle and also to simultaneously apply the emblem to the side body panels of an automotive vehicle. More particularly, the present invention relates to a body side molding apply fixture and control system as described above which has a pneumatically powered retainer for the body side molding.

BACKGROUND OF THE INVENTION

Most automotive vehicles have side body panels which have connected thereto body side moldings. The body side moldings provide for two major functions. One function of the body side molding is to protect the vehicle from dents and scratches associated with the opening and closing of vehicle doors by vehicle occupants and other vehicles parked laterally adjacent. The body side moldings also protect the side panels of the vehicle from dents and scratches by other articles such as shopping carts or other objects. A second function of the body side molding is to enhance the aesthetics of the vehicle. In the past, body side moldings were typically physically interconnected with the body panel and required a rivet or other fastener and a penetration hole to be made in the body panel. The prior technique was considered undesirable not only due to cost but penetration holes in the panels of the vehicle can inadvertently give rise to the entrance of moisture and/or other contaminants which can accelerate oxidation of the sheet metal of the vehicle. Accordingly, most body side moldings are now adhesively connected to the vehicle.

Since the body side molding contributes to the aesthetics of the vehicle the correct installation of body side molding to the vehicle is a critical factor. An incorrectly placed body side molding can result in a negative impression of quality that a potential buyer may have even though the installation of the body side molding will not materially affect the vehicles functional characteristics. This is even more particularly important in four door vehicles since the molding on the front and rear door should be parallel and should have the correct angle with respect to the vehicle to give the vehicle the overall side appearance that is desired. Therefore, it is desirable that the installation of body side molding to a vehicle be accomplished without errors to the greatest extent possible. Accordingly, most body side moldings are placed to the side of the vehicle by a body side molding apply fixture. Prior to the present invention, the body side molding fixture require that an installer place the body side molding on a plenum or body side molding presentation table against the spring action of a retainer. Although this process was acceptable, it was fatiguing to the operator. Additionally, in most instances of the past, the vehicle emblem was placed upon the vehicle separately from the body side molding. It is desirable to provide a body side molding apply fixture and control system thereof which is easier to load. It is additionally desirable to provide a body side molding apply fixture and control system which additionally incorporates the emblem application with confirmation of the correct placement of the emblem in the fixture.

SUMMARY OF THE INVENTION

To make manifest, the above delineated and other manifold desires, a revelation of the present invention is brought forth. In a preferred embodiment, the present invention provides a body side molding apply fixture and control system that frees the operator from having to load a body side molding to the fixture against the action of a retainer spring. The present invention provides significant ergonomic benefits to the operator by allowing the operator to load the body side molding to the fixture without fighting against the operation of a holding spring which was previously required. Additionally, the body side molding and apply fixture of the present invention allows the emblem which is typically a pressure sensitive adhesive back film to be simultaneously applied.

It is a feature of the present invention to provide a vehicle body side molding apply fixture and control system wherein loading of the body side molding is easier than prior systems. It is further a purpose of the present to provide a body side molding apply fixture and control system as described above further encompassing application of a vehicle emblem to the vehicle.

Other features of the invention will become more apparent to those skilled in the art from a reading of the following detailed description and upon reference to the drawings.

BRIEF DESCRIPTION OF THE DRAWINGS

FIGS. 2A, 2B, 2C, 2D, 2E, 2F, 2G and 2H are detailed pneumatic control system diagrams of a vehicle body side molding apply fixture of the present invention.

DETAILED DESCRIPTION OF THE INVENTION

Figure 1:
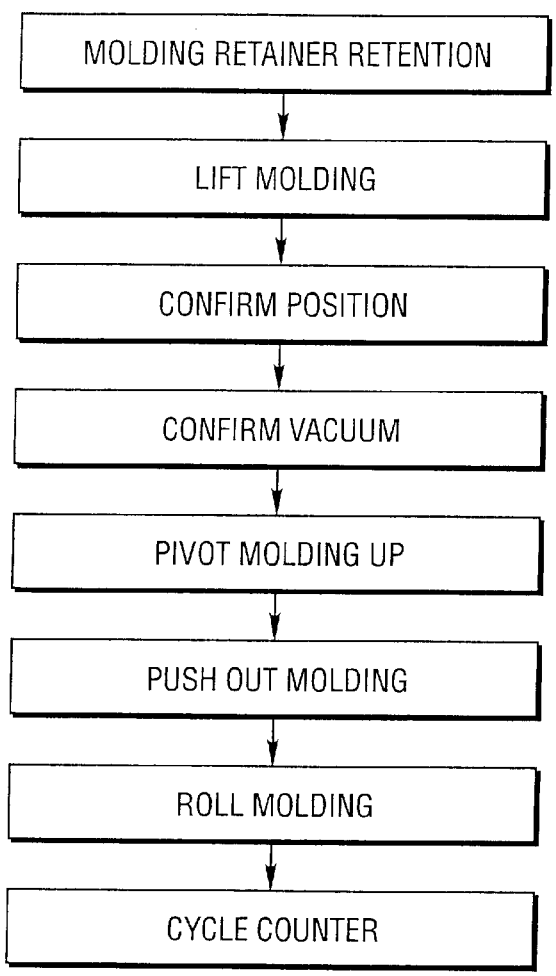
FIG. 1 is a flow chart illustrating operation of a body side molding apply fixture and control system according to the present invention.
Figure 3:
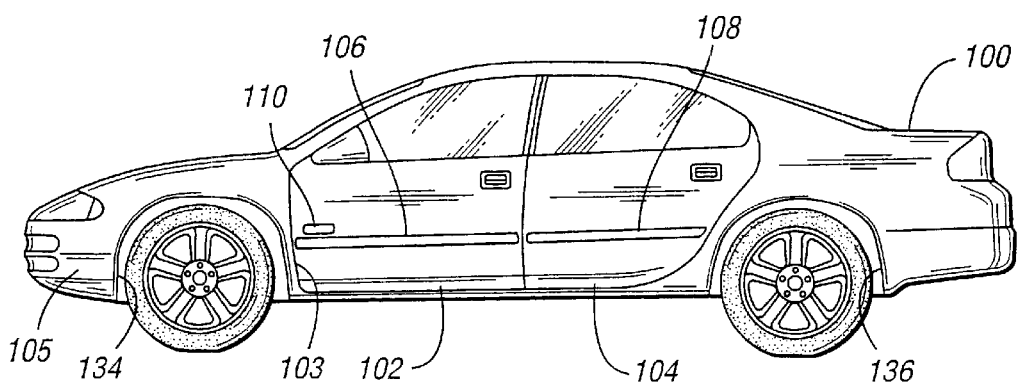
FIG. 3 is a side schematic view of a vehicle and body side molding applied thereon which is worked on by a body side molding apply fixture and control system according to the present invention.
Figure 23:
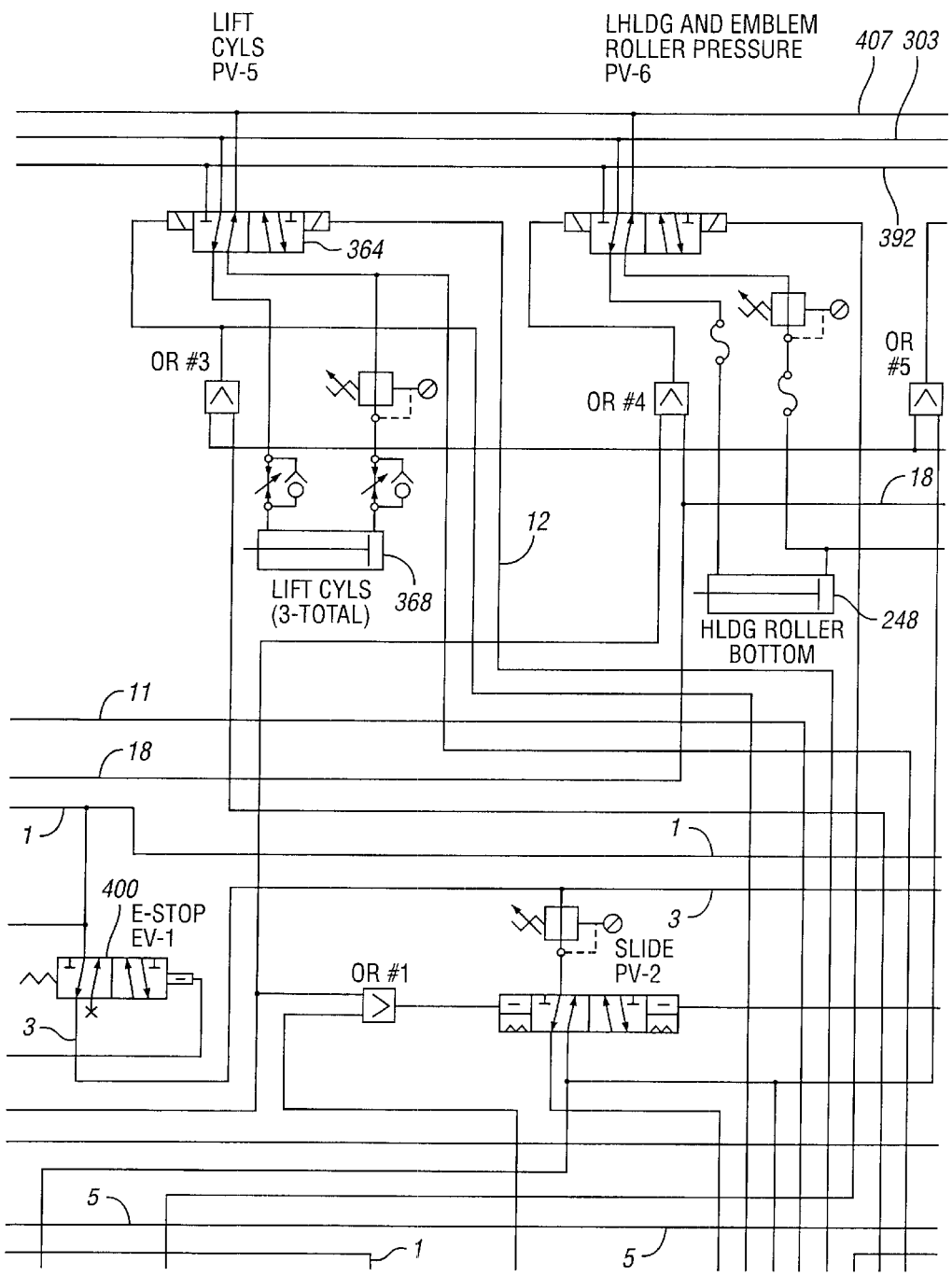

Referring to FIG. 3, an automotive vehicle 100 has a front door 102 and a rear door 104. The doors 102 and 104 each have body side moldings. Door 102 has body side molding 106 and door 104 has body side molding 108. Additionally, door 102 has a badge or emblem 110 (FIG. 3). To apply the side moldings 106, 108 and emblem 110 there is provided a body side molding and door emblem apply fixture 207 shown schematically in FIGS. 4–7.

The fixture 207 is supported on rollers 202. Rollers 202 supports bases 204. The bases 204 supports frame stands 206 which can be vertically elevated by pneumatically powered balances or lift cylinders 208. The stands 206 also support vacuum cups 210 which help secure the fixture 207 with the vehicle 100.

The stands 206 support also has a platform pivot arm 212. The pivot arm 212 via a cross plate 213 supports molding push out cylinders 214 (only one shown) and emblem push out cylinder 216 (only one shown). The pivot arm 212 moves the side moldings 106 and 108 and emblem 110 from a loading position with an adhesive side 112 of the moldings facing upwards to an applied position with the adhesive side 112 of the moldings oriented towards a side panel of the vehicle 100. A retainer arrangement fixture 220 is provided for loading the body side molding 106. The retainer arrangement fixture 220 has a fixed end 224 and actuated end 226. Actuated end 226 is powered by a cylinder 230. Cylinder actuated end 226 transversely contacts molding 106 adjacent an extreme forward end of the molding 106. The molding 106 has an adhesive side 112 having adhesive strips 114. The emblem 110 is held by a vacuum by a holding plate 262. The holding plate operation is further defined in co-pending U.S. patent application Ser. No. 09/714,447 filed Nov. 16, 2000, commonly assigned.

A housing 240 has fore and aft movement provided by a rodless cylinder 242. The housing 240 mounts pneumatic push out cylinders 244 and 248. A push out cylinder 244 mounts a roller 250 used to roll over the emblem 110 to connect the emblem with the door 102. A push out cylinder 248 mounts a roller 252 used to roll over an outside surface of the body side moldings 106 and 108 to connect the molding to the doors 102 and 104 respectively.

Referring additionally to FIGS. 1 and 2A through 2H, plant air is supplied at inlet 301 and is delivered into line 1. Air in line 1 passes through a valve 400 into line 3. Air in line 1 is delivered to a common rail 303. In a beginning of operation, retainer cylinders 230 are retracted so that moldings 106 and 108 can be manually placed within their respective retainer 220 with their adhesive side 112 faced up having two strips, 114 which cover the adhesive. A fixture operator will remove the adhesive strips 114 after placement of the molding 106 on a loading table 260. Since the retainer actuated end 226 is held back, loading of the molding 106 is now easier. A corresponding arrangement is provided for the molding 108.

The molding 106 and 108 are loaded longitudinally and aligned against a central stop 215 on the cross rail 213 which positionally correspond to a gap between the front and rear doors 102 and 104. The emblem 110 is also loaded in its holding plate 262 in a manner as described in an aforementioned Ser. No. 09/711,447 patent application, the disclosure of which is incorporated herein. The operator will then manipulate valves 310, 311 or 312 to lower the stand 206 up by operation of balancers 208. The stand is now lowered by the operator and positioned adjacent to the vehicle. The stand 206 is then raised until a set of fore and aft confirmation pointers 258 make contact with predefined points in the front wheel well 134 and rear wheel well 136 and gap 103 between the front door 102 and the front fender 105 of the vehicle 100 to confirm the fore and aft positioning of the fixture. If the fore and aft locator pointers 258 (only one shown) are properly located, confirmation of the position of the fixture 207 will be made through fore and aft locator limits 316 which are actuated by location pointers 258.

The operator can then activate valve 320 connecting plant air through a pneumatic control system line 1 with line 11. Line 11 pilots valve 324 to connect the plant air with the vacuum pump 328 through line 26. The operation of vacuum pump 328 activates vacuum switch 332. The vacuum switch 332 and line 5 through an AND gate 340 cause vacuum fixture made indicator light 344 to be turned on. Similarly, line 1 which also passes through a valve 348 into line 70.

Pressurized air in line 70 causes vacuum to be applied to the emblem 110 by one of three vacuum pumps 354. The vacuum switch 350 causes an emblem vacuum made indicator light 356 to turn on. When vacuum made indicator lights 344 and 356 and are turned on, the control system is now ready to start into a automatic actuation mode.

Cycle start switch 360 is activated causing line 9 to be connected to line 12. Line 12 in turn pilots valve 364 to cause three lift cylinders 368 to operate causing the pivot arm 212 to pivot to an apply or almost vertical position. The operation of lift cylinder 368 causes a delay in the molding push out timer 374 and in the emblem push out timer 378 which then pilots emblem push out cylinder 216 and molding push out cylinder 214. The push out cylinders 214 and 216 are retracted and the moldings 106 and emblems 110 are rolled over by rollers 250 and 252. Rollers 250 and 252 are pushed out by cylinders 244 and 248, respectively. A rodless slide cylinder 242 translates the rollers 250 and 252 longitudinally along the vehicle. A complete cycling of the rodless cylinder 242 causes a cycle counter 268 to be actuated and installation of the emblem and body side molding is now complete.

Figure 8:
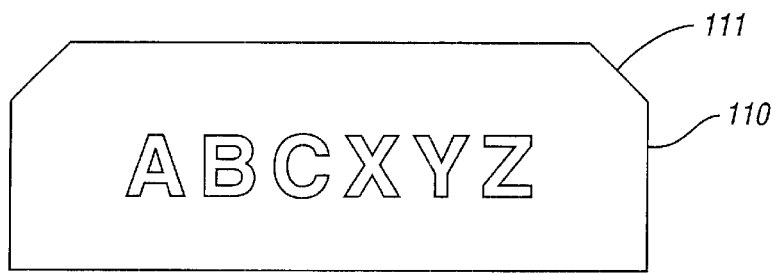
FIG. 8 is a front elevational view of a typical emblem which is installed to the vehicle by the body side molding apply fixture and control system according to the present invention.

AND gate 352, OR gate 376, and NOT gate 380 form a pneumatic control circuit to provide a second confirmation of the presence, choice of, and orientation of the emblem in the holder 262. The emblem 110 (FIGS. 7–8) has cut outs 111 at its corners which cause vacuum holes 217 in the holding plate to be exposed if an incorrect emblem or emblem orientation is experienced. A more detailed description of the workings of this circuit and be found by a review of U.S. patent application Ser. No. 09/714,477.

Figure 2C:
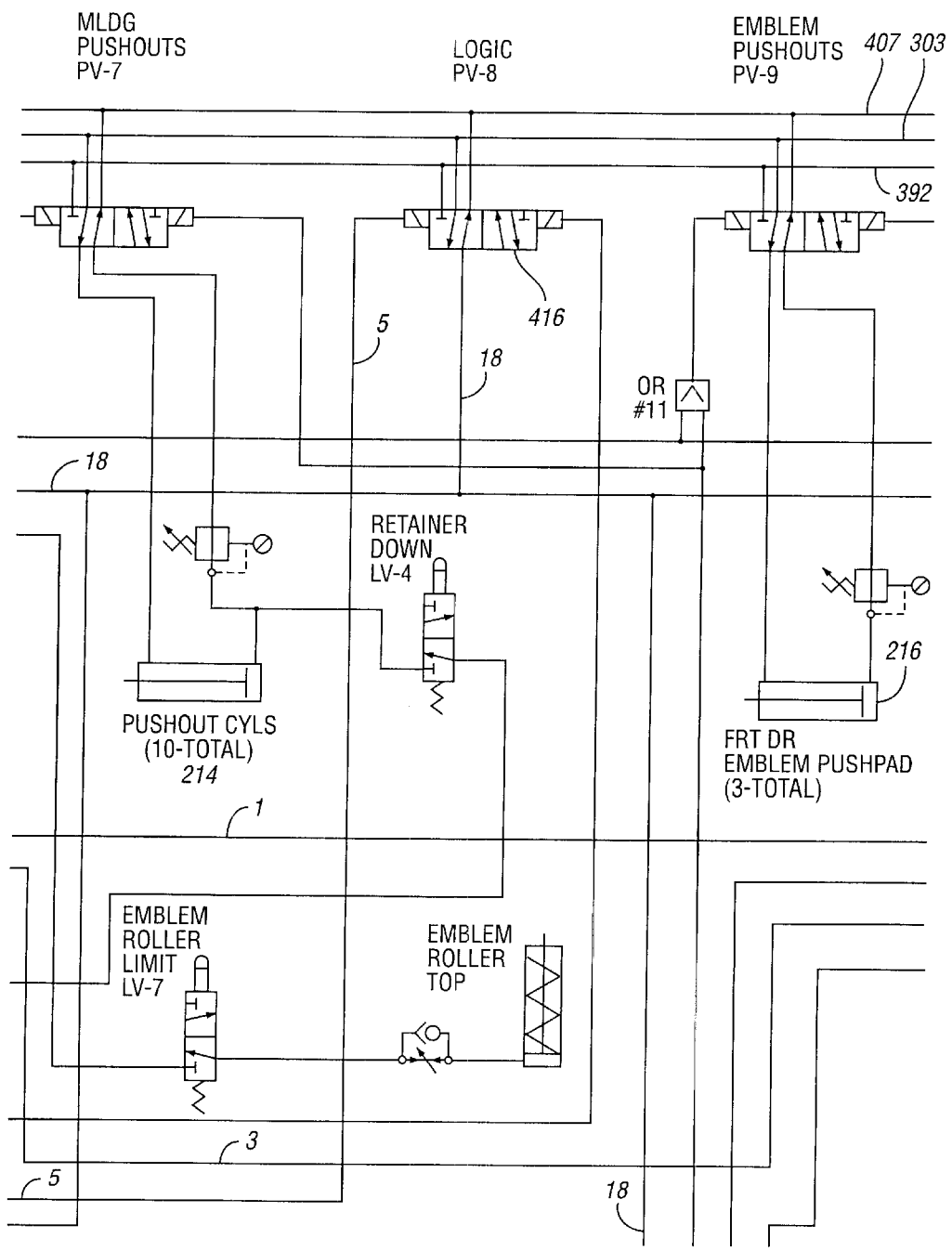
Figure 26:
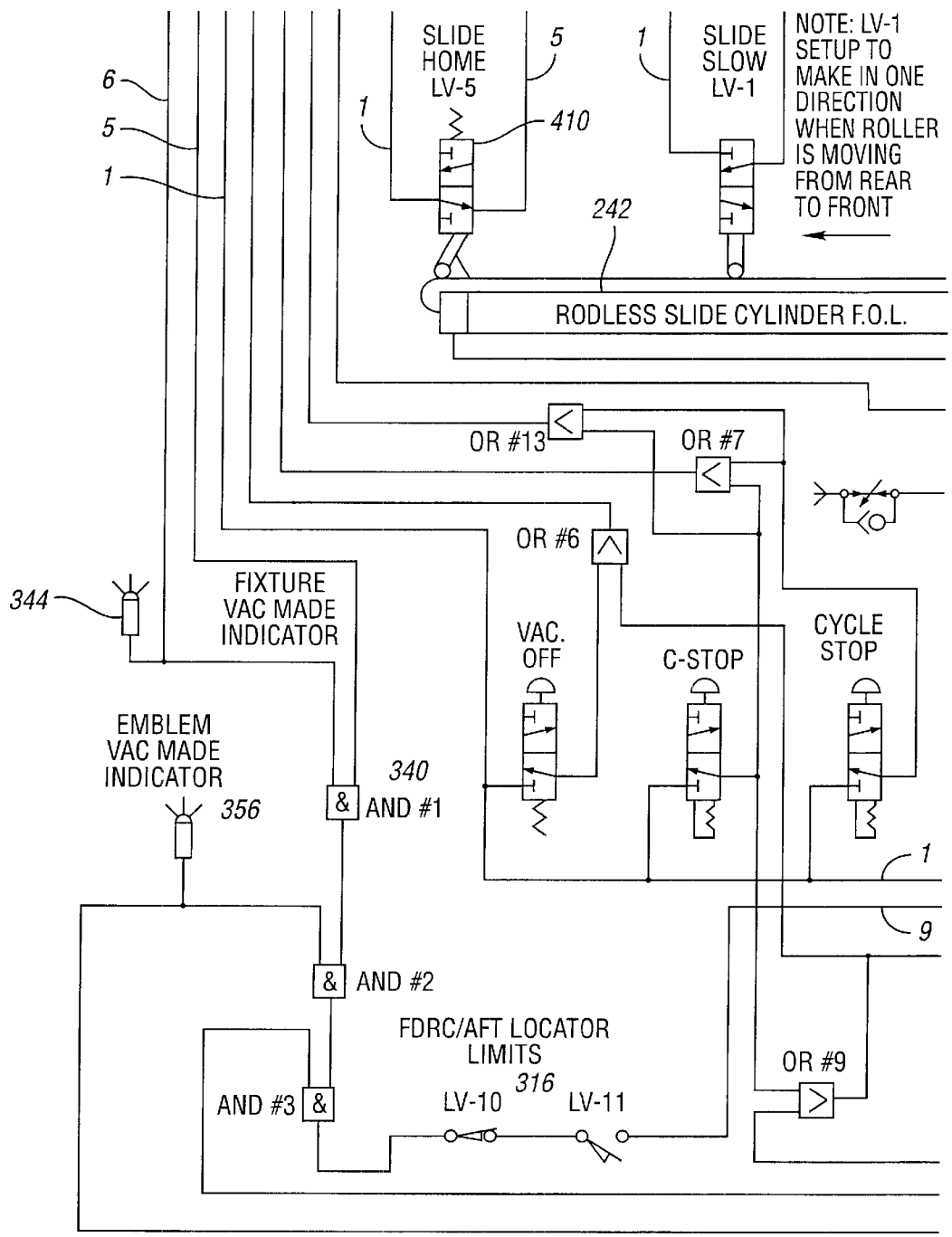
Figure 2F:
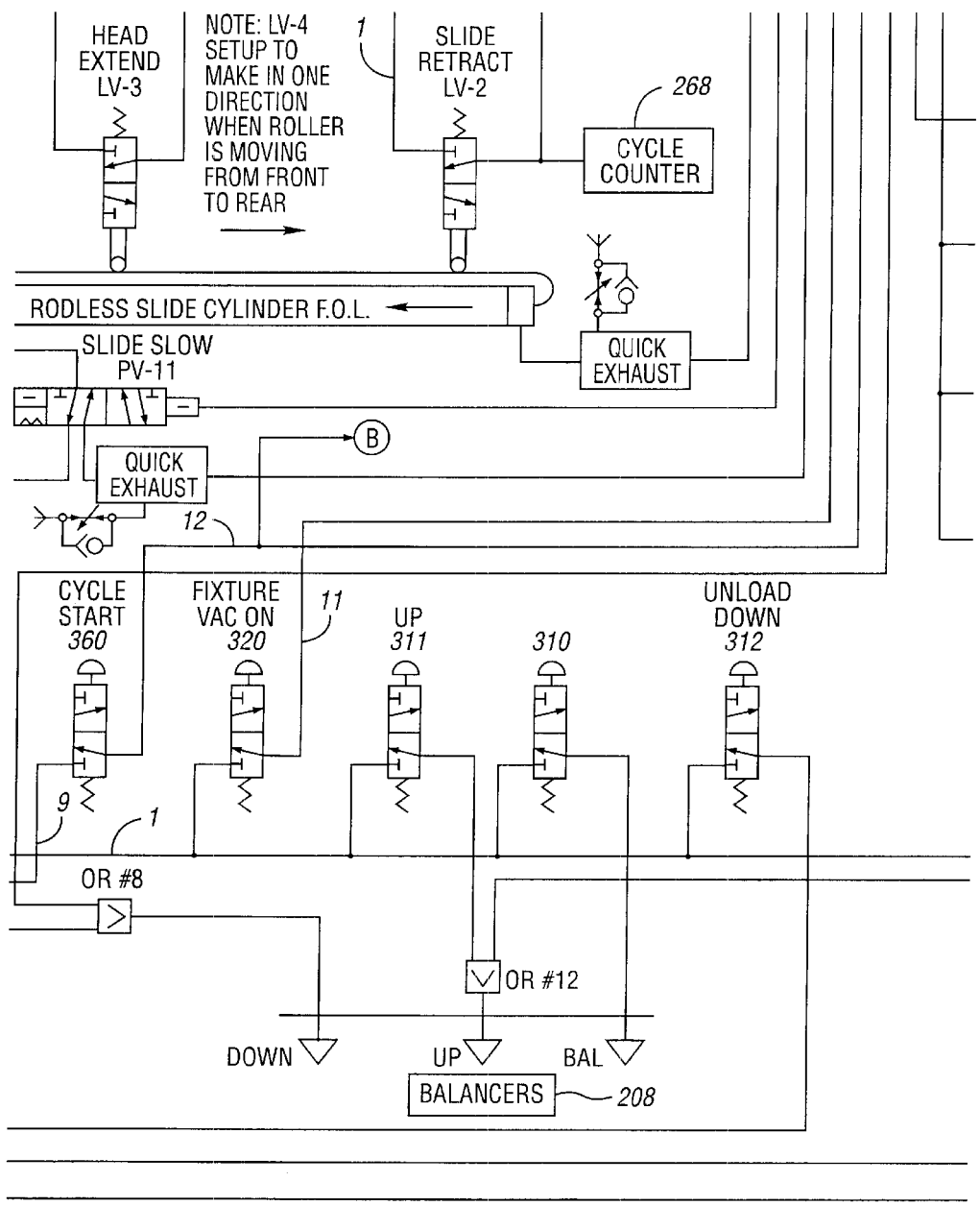
Figure 26:
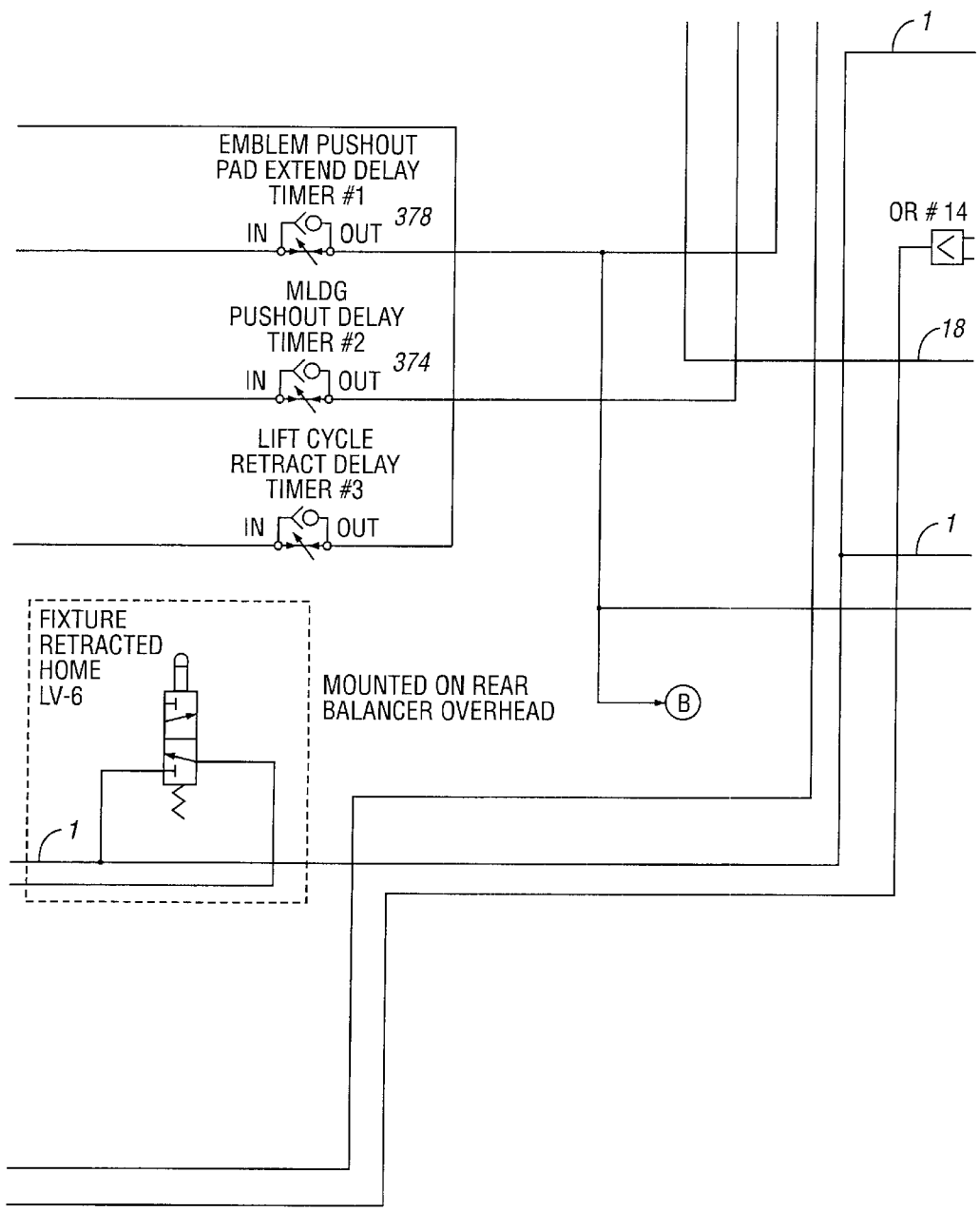
Figure 25:
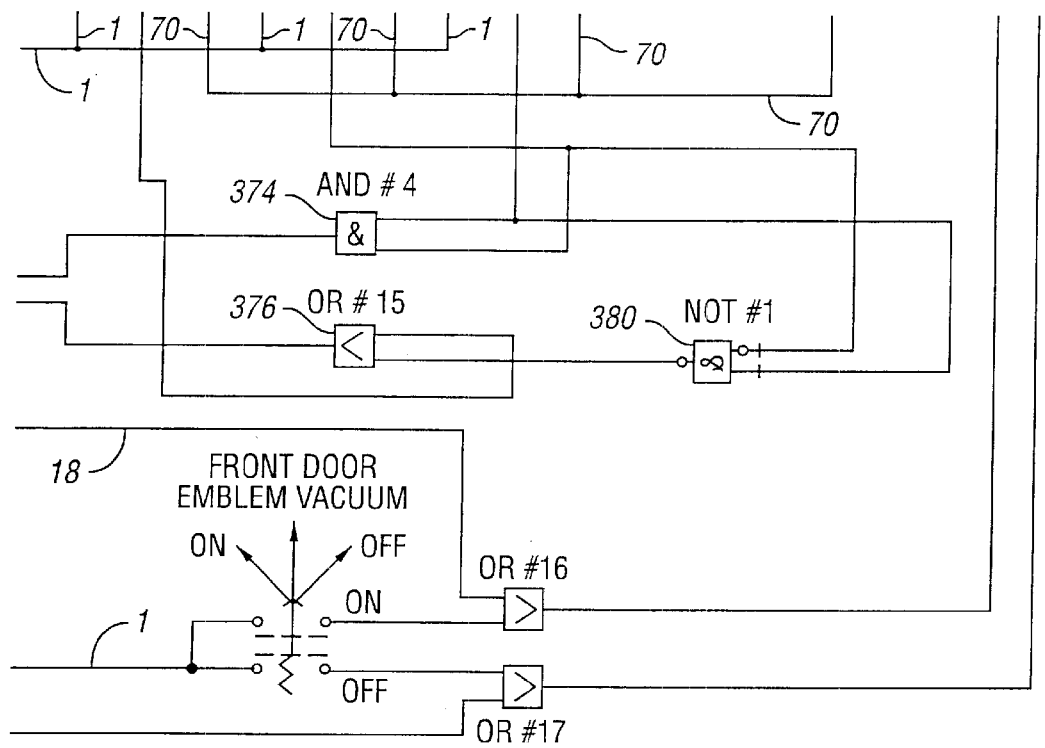
Figure 4:
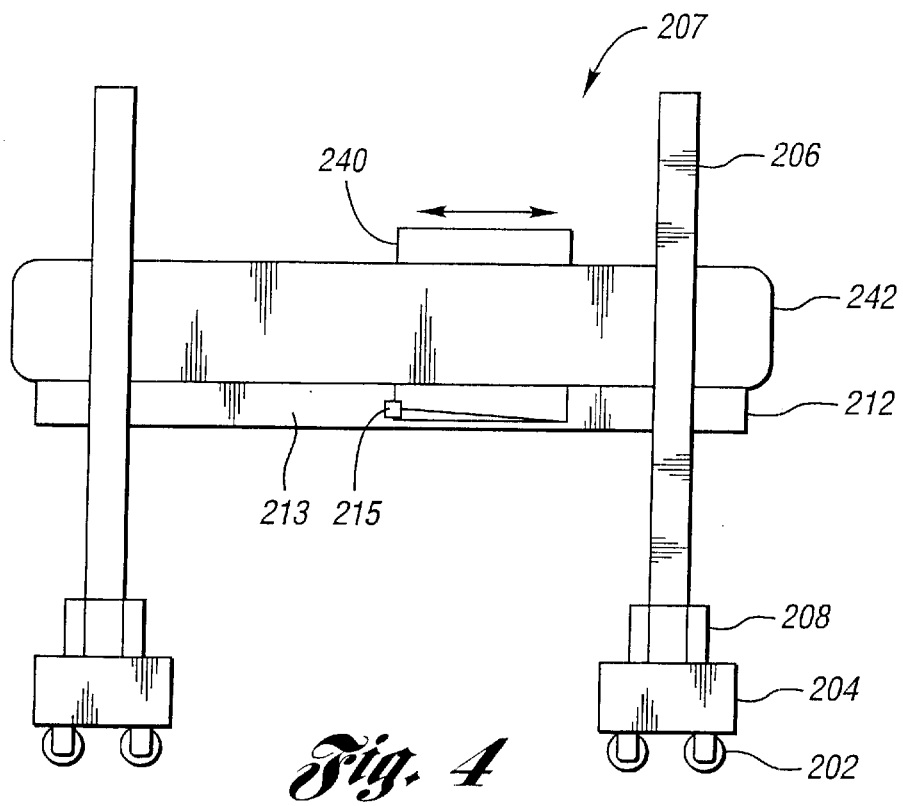
FIG. 4 is a schematic front elevational view of the vehicles body side molding apply fixture according to the present invention.
Figure 5:
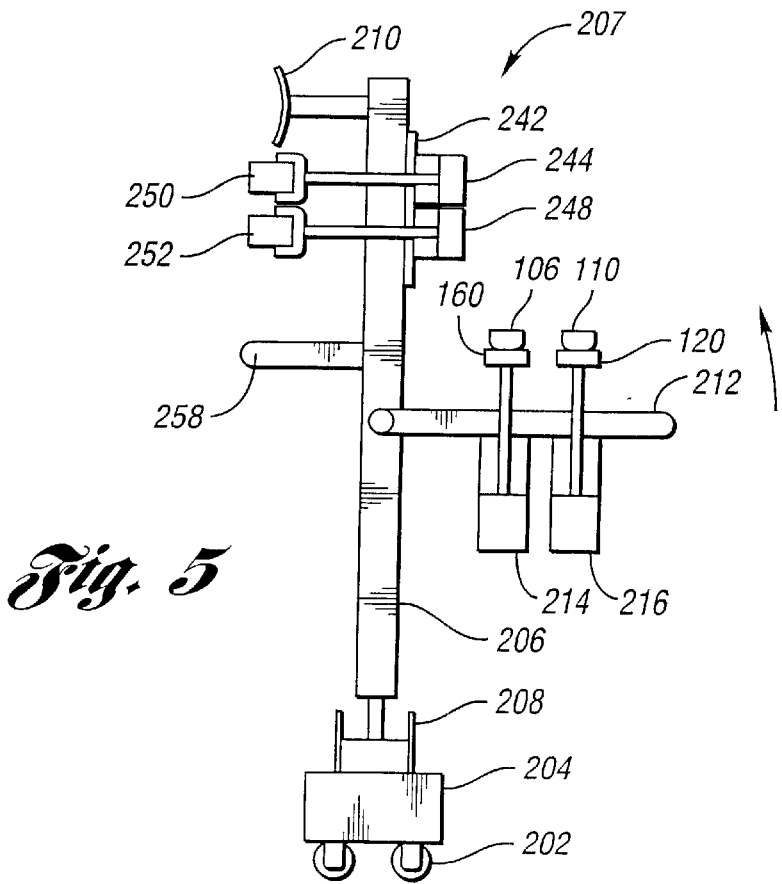
FIG. 5 is a side elevational schematic view of the body side molding and apply fixture shown in FIG. 4.
Figure 6:
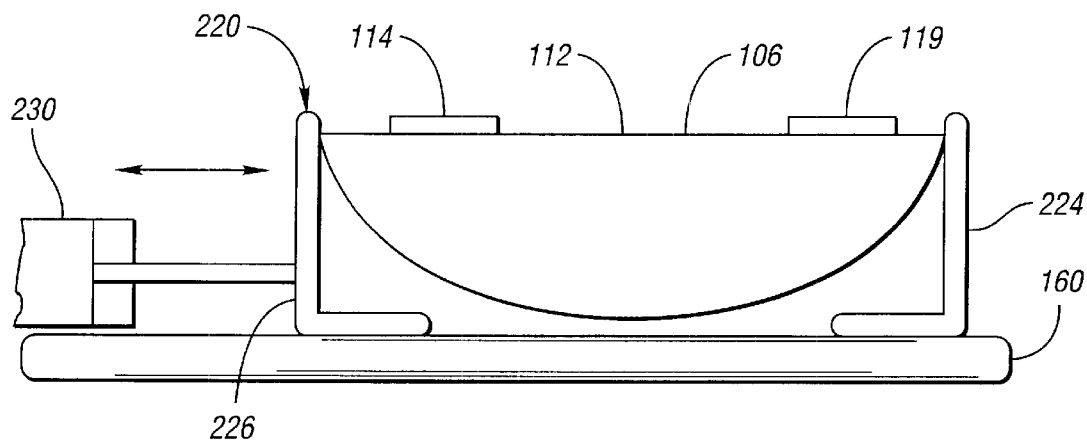
FIG. 6 is an enlarged view of the retainer section which retains the body side molding to the body side molding apply fixture shown in FIGS. 4 and 5.
Figure 7:
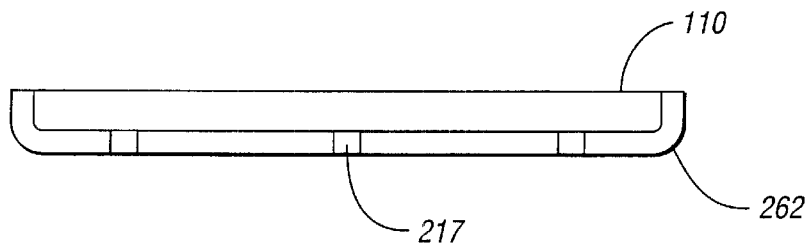
FIG. 7 is a schematic view of a portion of the fixture which is utilized in applying the emblem to the vehicle.

Referring back to the retainer arrangement fixture 220, the molding retainer cylinder 230, as shown in FIG. 2C, is initially in the retracted position with actuated end 226 retracted towards the cylinder 230. Accordingly, the operator can place the body side molding 106 within the fixture without fighting the force of a retainer spring acting upon the activated end 226. Prior to the present invention, this factor alone required additional manpower to be utilized in the body side molding apply operation. A body side molding retainer valve 390 in the rest position connects a line 52 with a rail exhaust line 392. The valve 390 also connects line 46 with the pressurized rail line 303. Placement of the body side moldings 106 and 108 in their proper position causes limit switches 394 and 396 to be tripped. Plant air on location 301 in FIG. 2A is delivered through emergency stop system valve 400 in normal operation into line 3. Pressurized air in line 3 through the tripping of limit valves 394 and 396 is allowed to enter into line 50 and into line 51. Pressurized air in line 51 passes through thrust valve 404 causing the molding retainer valve 390 to be activated to the left as shown in FIG. 2D. The movement of the valve 390 to the left causes pressurized air from line 303 to be delivered into line 52 to extend a rod of cylinder 230. At the same time, line 46 by the valve 390 is connected with exhaust line 407. The moldings 108 and 106 will now be automatically retained. The upward movement of the pivot arm 212 will cause the body side moldings 106 and 108 to be held with their surface 112 in a vertically orientated position and the molding push-out cylinders 214 will overcome this side loading force. At the end of the application cycle, the rodless cylinder 242 will trip the slide home limit valve 410 shown in FIG. 2A. The tripping of the limit valve 410 resets a logic valve 416 through line 5. The reset of the logic valve 416 causes activation of pilot line 60 via line 18 causing the molding retainer retention valve 390 to be moved to its normal position wherein the cylinder rod 230 is retracted in the activated end 226 is towards the cylinder 230 instead of towards the body side molding 106. The retainer arrangement 220 is now ready for the next reloading.

While the invention has been described in conjunction with a preferred embodiment, it will be understood that it is not intended to limit the invention to that particular embodiment. On the contrary, it is endeavored to cover all alternatives, modifications and equivalents as may be included within the spirit and scope of the invention as encompassed by this description and as defined by the appended claims.

I claim:

1. In an automotive body side molding apply fixture and control system including a frame; a pneumatically powered vertical elevator vertically moving the frame; a fore and aft position first confirmation unit; a pneumatically powered pivotal arm for moving a side molding from a loading position with an adhesive side up to an applied position with an adhesive side position towards a side panel of an automotive vehicle; a pneumatically powered push out cylinder to push said molding towards said vehicle; a pneumatically powered roller to roll on an outside surface of said molding to connect said molding with said vehicle side panel; and a counter for counting cycles said molding apply fixture has undergone the improvement comprising:

a molding retainer pneumatically opened to an extreme open position for insertion of said molding therein and being pneumatically powered to open on manual loading of said side molding and to transversely close upon said molding to retain said molding to said pivotal arm upon a beginning of the cycle of said automotive body side molding apply fixture.

2. An apparatus as described in claim 1 wherein there are first and second molding retainers for a fore and aft molding on said vehicle.

3. An apparatus as described in claim 2 further including a second pneumatic confirmation unit and pneumatically powered push out unit and a powered push out roller for applying an emblem to a side of said vehicle adjacent to said body side molding.

4. In an automotive body side molding apply fixture and control system including a frame; a pneumatically powered vertical elevator vertically moving the frame; a fore and aft position first confirmation unit; a pneumatically powered pivotal arm for moving a side molding from a loading position with an adhesive side up to an applied position with an adhesive side position towards a side panel of an automotive vehicle; a pneumatically powered push out cylinder to push said molding towards said vehicle; a pneumatically powered roller to roll on an outside surface of said molding to connect said molding with said vehicle side panel; and a counter for counting cycles said molding apply fixture has undergone the improvement comprising:

a molding retainer pneumatically opened to an extreme open position for insertion of said molding therein and being pneumatically powered to open on manual loading of said side molding and to transversely close upon said molding to retain said molding to said pivotal arm upon a beginning of the cycle of said automotive body side molding apply fixture and wherein a second pneumatic confirmation unit and pneumatically powered push out unit and a powered push out roller for applying an emblem to a side of said vehicle adjacent to said body side molding.

5. An apparatus as described in claim 4 wherein said molding retainer is normally open and the loading of said body side emblem to said molding retainer causes said molding retainer to close upon said body side molding.

\* \* \* \* \*